(No Model.) 2 Sheets—Sheet 1.
E. P. FOLLETT.
FISHING ROD AND REEL.
No. 415,322. Patented Nov. 19, 1889.
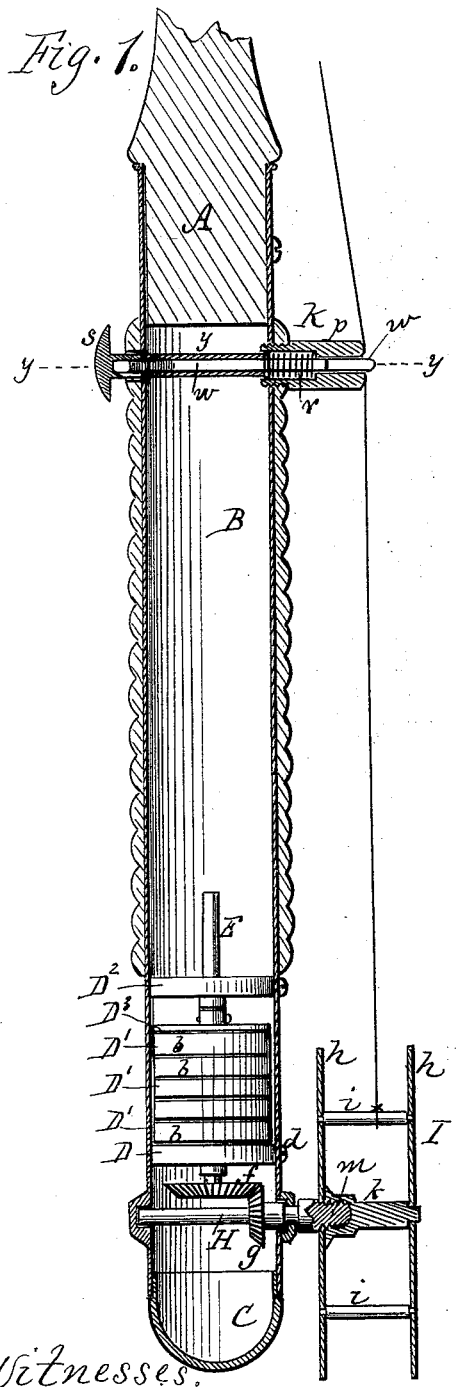
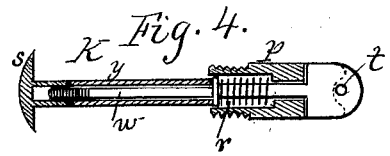
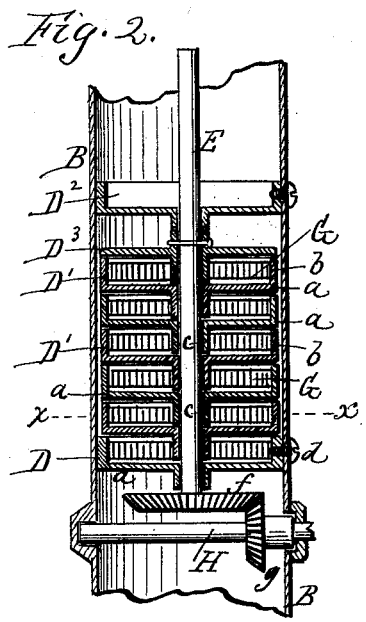
Witnesses:
C. A. Spencer
C. H. Hunt
Inventor.
Edward P. Follett,
pr R. F. Osgood,
Atty.

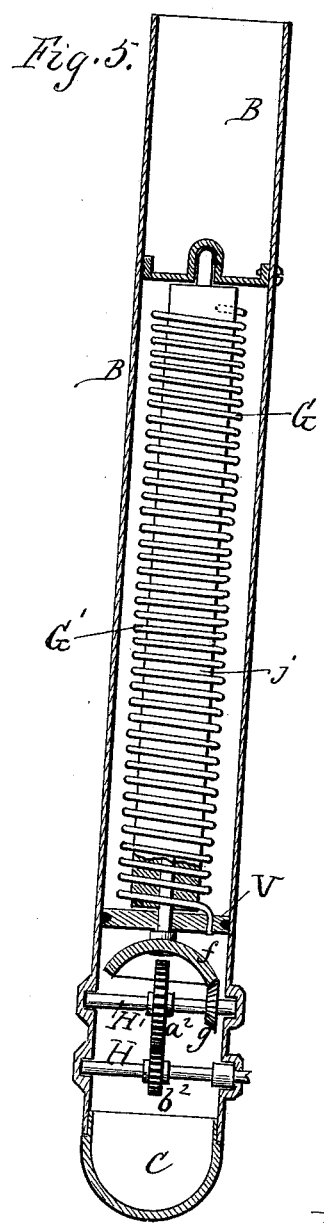

UNITED STATES PATENT OFFICE.

EDWARD P. FOLLETT, OF ROCHESTER, ASSIGNOR TO CHARLES A. WHITE AND OLIVER P. ROSS, OF OLEAN, NEW YORK.

FISHING-ROD AND REEL.

SPECIFICATION forming part of Letters Patent No. 415,322, dated November 19, 1889.

Application filed May 2, 1889. Serial No. 309,396. (No model.)

*To all whom it may concern:*

Be it known that I, EDWARD P. FOLLETT, of Rochester, in the county of Monroe and State of New York, have invented a certain new and useful Improvement in Combined Fishing-Rods and Reels; and I do hereby declare that the following is a full, clear, and exact description of the same, reference being had to the drawings accompanying this application.

My improvement relates to combined fishing-rods and reels in which the line is drawn in by a spring instead of by a cranked wheel. In ordinary cranked reels of the automatic kind a spring is located in and gives motion to the reel located outside the shaft.

In my invention a spring or springs are located inside a ferrule attached to the butt of the rod and forming a part of it, and the line winds on a detachable spool operated by the spring or springs, as hereinafter described.

In the drawings, Figure 1 is a longitudinal section of the butt of a fishing-rod, showing my invention applied thereto. Fig. 2 is a similar enlarged view of a portion of the ferrule, the spring, and gearing. Fig. 3 is a cross-section in line $x\ x$ of Fig. 2. Fig. 4 is a section of the brake attachment in line $y\ y$ of Fig. 1. Fig. 5 is a view similar to Fig. 1, but showing a modification.

A indicates the butt of an ordinary fishing-rod.

B is a ferrule consisting simply of a section of tube attached at one end to the butt of the rod, and provided at the other with a removable cap C, by removing which the interior of the ferrule can be reached for oiling the parts or for other purposes.

D D′ D′ D′ are a series of flanged rings, forming inclosures for the springs, located inside the ferrule. Each of these rings consists of a back $a$, a projecting rim or flange $b$, and a hub $c$. The rim projects forward, making the inclosure, while the hub projects backward, as shown. The outer ring D is made close-fitting to the sides of the ferrule, and is secured fast thereto by a set-screw $d$ or other means. The other rings D′ D′ D′ fit loosely inside the ferrule, and also loosely around a spindle E, that extends through holes in all the rings and has its bearing at one end in the outer ring D and at the other in a similar ring D², made fast to the inside of the ferrule. The operating-rings all fit close together face to face, as shown, the flange of one ring resting close to the back of the next preceding, thus forming an inclosure, and the hub of one ring projecting back into the cavity of the next in the rear thereof, as shown in Fig. 2.

D³ is a disk pinned or otherwise attached fast to the spindle and forming a cover to the innermost ring D′.

G G G are a series of coiled springs, similar to watch-springs, located in the cavities of the rings, one end of each of said springs being attached to the rim or flange of one ring and the other end being attached to the hub of the next ring. The first spring is attached to the ring D³, that is fast to the spindle, and the last spring is attached to the fixed ring D at the base of the rod. Thus when the spindle is turned the springs are gradually wound up, and, owing to their great combined length, the winding capacity is considerable. The springs may be attached in any desired way. In Fig. 3 one end of the spring is shown attached to a hook on the inside of flange $b$ of one ring and the other to a similar hook on the outside of hub $c$ of the next ring.

H is a shaft extending across the interior of the ferrule and projecting out through one side.

$f$ is a bevel-gear on the end of spindle E, and $g$ a bevel-pinion on shaft H, said gears engaging as shown.

I is a spool attached to the outer end of shaft H, on which spool the line winds. In drawing out the line the gearing is turned, thereby winding up the springs. When the tension on the line is released, the springs uncoil, thereby winding up the line automatically. The whole length of the line can be thus wound up or any portion of it, and in case a fish is caught the tension on the line will always keep it taut whether the fish runs forward or back. The spool is preferably made of two side plates $h\ h$, connected together by cross-pins $i\ i$, and provided with a hub $k$, with an internal thread which screws on a screw-stem $m$ on the outer end of the shaft H. By this means the spool can be removed by simply unscrewing it from the shaft.

K, Fig. 4, is a brake for controlling the line, consisting of a stationary plug $p$, which screws in from one side of the ferrule, and a pin or plunger $w$, that passes through the ferrule from the opposite side and enters the plug, being pressed back by a coiled or other spring $r$. On the outer end of the pin is a thumb-piece $s$, by which the pin can be pressed in against the spring, and in the opposite end, which enters the plug, is a hole $t$, through which the line passes. When the pin is released, the spring forces it back and clamps the line between the loop and the end of the plug and holds it in place; but when the pin is pressed in the line is unclamped and is free to run out or in. The finger-piece is located in convenient position to be acted on by the thumb or finger without changing the position of the hand on the rod. In order to increase or lessen the reaction of the spring, a tube $y$ is placed loosely around the pin $w$, which is pressed up by the thumb-piece $s$, which screws on the end of the pin.

Fig. 5 shows a modification in which a single spring can be made effective for drawing in the line. In that case a spiral spring G' is coiled loosely around a central core $j$ inside the ferrule, being attached at one end to the spindle E and at the other to a ring V, provided with a rubber packing at its edge and slipped into the ferrule. The gearing may be the same as that before described; but, if desired to multiply the motion, an additional cross-shaft H' may be used and additional gears $a^2$ $b^2$ connect the two shafts H H'.

Having described my invention, I do not claim a spring-reel located outside the rod and serving to draw in the line automatically; but

What I claim as new, and desire to secure by Letters Patent, is—

1. The combination, with a fishing-rod, of a ferrule attached to the butt, a spring or springs located in its interior serving as the motive power, and gearing connecting the spring with a shaft that extends outside the ferrule to communicate motion to a winding-spool, as specified.

2. In a fishing-rod, the combination of a ferrule attached to the butt, a spring or springs located inside the ferrule, a spindle by which the springs are wound up, a cross-shaft projecting through the ferrule, gearing connecting the spindle and cross-shaft, and a spool attached to the cross-shaft, as and for the purpose specified.

3. In a fishing-rod, the combination of a ferrule attached to the butt, a spindle located inside the ferrule, a set of rings surrounding the spindle, the exterior ones attached, respectively, to the ferrule and the spindle, and the intermediate ones running free of both the ferrule and spindle, and a set of springs between the rings, their ends attached, respectively, to the opposite rings, as shown and described, and for the purpose specified.

4. In a fishing-rod, the combination of a ferrule attached to the butt, a spindle located inside the ferrule, a set of rings surrounding the spindle, the extreme ones attached, respectively, to the ferrule and spindle and the intermediate ones running free, a set of springs connected with the rings, a cross-shaft extending through the ferrule, gearing connecting the spindle and cross-shaft, and a spool attached to the cross-shaft, as herein shown and described.

5. In a fishing-rod, the combination of the ferrule, the springs located therein, the spindle, the cross-shaft, the gearing connecting the spindle and cross-shaft, the spool on the cross-shaft, and the brake consisting of the plug $p$, attached to the ferrule on one side, and the spring-pin $w$, passing through the ferrule from the opposite side and provided with a hole through which the line passes, and by which it is clamped against the end of the plug, as herein shown and described.

In witness whereof I have hereunto signed my name in the presence of two subscribing witnesses.

EDWARD P. FOLLETT.

Witnesses:
R. F. OSGOOD,
F. B. HUTCHINSON.